United States Patent [19]

Rinn et al.

[11] Patent Number: 4,491,289

[45] Date of Patent: Jan. 1, 1985

[54] MULTIPLE LOCKING DEVICE INSENSITIVE TO THERMAL VARIATIONS ESPECIALLY APPLICABLE TO SPACE VEHICLES

[75] Inventors: Christian Rinn; Gérard Vezain, both of Mandelieu, France

[73] Assignee: Societe Nationale Industrielle Aerospatiale, Paris, France

[21] Appl. No.: 458,690

[22] Filed: Jan. 17, 1983

[30] Foreign Application Priority Data

Jan. 22, 1982 [FR] France ............................... 82 00962

[51] Int. Cl.$^3$ ........................... B64G 1/66; B64G 1/44
[52] U.S. Cl. .................................. 244/158 R; 244/173
[58] Field of Search .......................... 244/158 R, 173; 292/256, 256.5, 257

[56] References Cited

U.S. PATENT DOCUMENTS 4,347,023  8/1982  Rizos .................................... 244/173

FOREIGN PATENT DOCUMENTS 0081401  6/1983  European Pat. Off. ............ 244/173
0153500  3/1979  Japan .................................... 244/173

OTHER PUBLICATIONS

Barkats, "Development of a Rigid Fold-Out Solar Array ...", Proc. European Symp. on Photovoltaic Generators in Space, 9-1978, pp. 169-180.

Primary Examiner—Galen L. Barefoot
Attorney, Agent, or Firm—Karl W. Flocks; Sheridan Neimark; A. Fred Starobin

[57] ABSTRACT

A locking device for clamping or sheaving appendices aboard a satellite during the launching phase provides for temporary locking thereof which both limits the required holding forces and authorizes multiplication of the clamping or sheaving points for each appendix while being insensitive to temperature variations. It comprises a stop catch jointed to a foot rigidly secured to the satellite structure, to ensure immobilization of the element to be temporarily locked thereby, an elbow lever hinged to the stop catch and connected to a sheaving cable, and an elastic link exerting upon the lever a force to balance the holding force exerted by the sheaving cable. The locking device remains in the locked position as long as the shearing device for cutting off the cable has not been operated. Furthermore the combination of the elbow lever and the elastic link provides means for ensuring perfect locking, even in the case of significant differential dilatations between the body of the space vehicle and the sheaving cable.

3 Claims, 10 Drawing Figures

MULTIPLE LOCKING DEVICE INSENSITIVE TO THERMAL VARIATIONS ESPECIALLY APPLICABLE TO SPACE VEHICLES

It is known that spacecrafts use appendices such as solar generators, antenna reflectors, masts . . . which must be stored aboard the vehicle during the launching phase.

During the launching said appendices are maintained aboard the satellite by a sheaving device that may comprise one or more temporary securement points or sheaving points.

The large dimensions of such appendices require them to be folded up so as to be storable within the volume provided by the launchers.

This launching or sheaved configuration meets multiple requirements among which the following can be cited:

the limited volume of the launching means;

the geometric dimensions determined as a function of the interface with the satellite;

the operation that should enable release of the appendix for the displaying thereof;

the mechanical strength to accelerations produced by the launching means;

the rigidity which is intended for providing frequency uncoupling between the launching means, the satellite and the appendices, in order to limit the loads and therefore to permit realization of structures having a minimum mass;

the imperative obligation of multiplying the sheaving points to take into account the sizes of the elements and the required frequencies.

This invention relates to a device for advantageously providing under the above mentioned conditions such a temporary locking which both limits the required holding forces in the release system, and authorizes multiplication of sheaving points locked and released through a single sheaving cable, and permits to solve the problems of differential dilation between the sheaving cable and the satellite structure to which they are secured.

The multiple locking device insensitive to thermal variations according to the invention is characterized by the combination of the following means in each sheaving point:

a stop catch hinged to the foot of the sheaving point, such stop catch providing temporary immobilisation of the element to be locked at the sheaving point;

an elbow lever hinged to the stop catch on the one hand and on the other hand connected to the sheaving cable; and an elastic link jointed to the foot of the sheaving point on the one hand, and on the other hand, to the elbow lever in such way that said elastic link exerts upon the elbow lever a force contrary to the holding moment exerted thereupon by the sheaving cable;

whereby the temporary immobilisation of the element to be locked at the sheaving point is produced by the sheaving cable which through the elbow lever and the elastic link holds the stop catch to its locked position as long as the sheaving cable cutting device has not been operated.

Other characteristics and advantages and specific features of this invention will appear from the following description made in reference to the attached drawings which represent schematically in a merely exemplifying way a possible form of embodiment of said invention.

Figure 1:
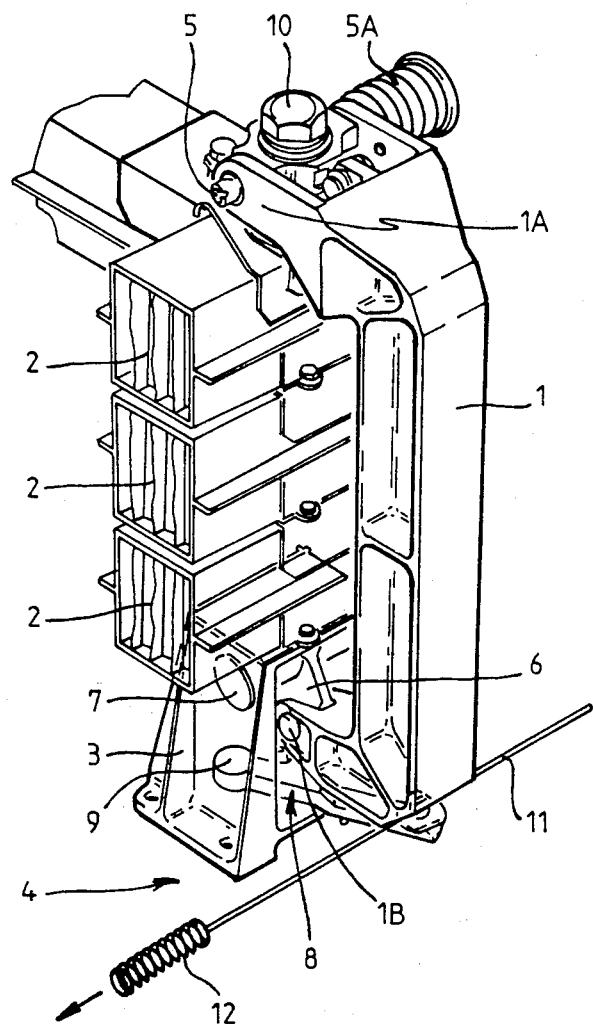
FIG. 1 is a perspective view of a sheaving point in a prior art solar generator of a kind liable to integrate a multiple locking device according to the invention.

The sheaving point of the solar generator as shown in the exemplifying manner in FIG. 1 which is not the subject-matter of this invention, is characterized by the following constitutive elements:

a sheaving clamp 1 to provide the holding force for flaps 2, on the sheaving foot 3, itself rigidly secured to the structure 4 of the satellite, it being noted that the upper end $1_A$ of the clamp 1 is hinged at 5 to the outer flap and is submitted to the action of a return spring $5_A$.

a link 6 hinged at 7 to the foot 3 and onto which the lower end $1_B$ of clamp 1 is hooked, a stop catch designated by the general reference 8, also hinged at 9 to the foot 3 which prevents rotation of the link 6 and release of clamp 1, as will be shown in detail hereinafter. Such link 6 is held in a self-release position, i.e. the tensioning force of clamp 1 acting as a spring due to a tensioning screw 10 causes rotation of link 6 in the event that stop catch 8 should move off;

a sheaving cable 11 which maintains the stop catch 8 in the launching locked position against the bias of a return spring 12.

The release of the solar generator, to display it, is produced by shearing the sheaving cable 11 thereby causing:

the moving off of the stop catch 8 through the biasing force of its return spring, the rotation of the link 6, the rotation of the clamp 1 under the biasing force of its return spring $5_A$, It will be immediately understood that the sheaving device proper of an appendix of a space vehicle may consist of a certain number of sheaving points such as described hereinabove.

Moreover, the reliability requirements make it necessary to cause release of the all the sheaving points through a single pyrotechnical shearing means which through a common sheaving cable or shuttle, provokes simultaneous unlocking of all the sheaving points.

Figure 2:
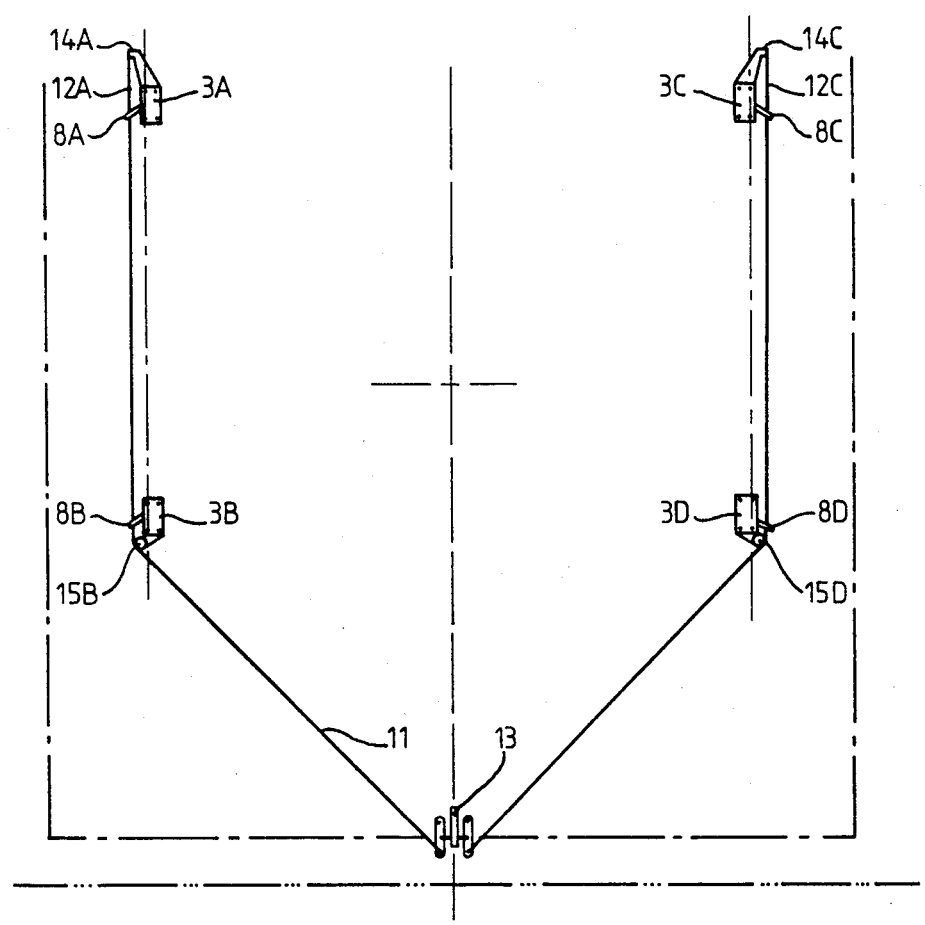
FIG. 2 is an explanatory diagram of installation of a sheaving device for a solar generator held through 4 sheaving points.

FIG. 2 shows in an exemplifying manner a schematic diagram of a sheaving device for a solar generator held through four sheaving points $3_A$, $3_B$, $3_C$ and $3_D$, and the respective stop catches $8_A$, $8_B$, $8_C$ and $8_D$ of which are maintained into the locking position through a common sheaving cable 11. In an appropriate location on the cable there is inserted a pyrotechnical shearing means 13 of a known type, while two return springs $12_A$ and $12_C$ are respectively secured between both free ends of the sheaving cable 11, and two fixed points $14_A$ and $14_B$, linked to the sheaving points $3_A$ and $3_B$ in the occurrence. Return pulleys $15_B$, $15_D$ provide for perfect orientation of cable 11 to hold stop catches $8_A$, $8_B$, $8_C$ and $8_D$ in the locking position.

It will be understood that a respective locking device will be provided for each of the appendices of a space vehicle other than the solar generators as well as also for each of said generators.

Furthermore, it appears that in each of the locking devices the multiplication of the number of sheaving points which can be, e.g. 6, 8, 10 in number or more, as well as the use of a single sheaving cable connecting all the stop catches together present two major inconveniences:

the addition of the holding forces of the stop catches in the single sheaving cable which results in a limitation of the number of sheaving points as a function of the cable strength, the differential dilation of the satellite body and the cable caused by temperature variations both of the satellite body and the sheaving cable.

Such differential dilations can produce two effects:

(a) The case of increase in temperature:

A decrease in the cable tension is produced causing decreased clamping force at the sheaving points;

(b) The case of the decrease in temperature:

There is produced an increased cable tension which might provoke untimely breakage thereof.

This problem of the differential dilation presents more serious consequences in geostationary satellites, the launching sequential steps of which comprise a transfer phase during which the satellite is being stabilized according to three of its axes.

As described in the Applicant's U.S. patent application Ser. No. 370,909 of 4/22/1982 the space vehicle always offers the same face to the direction of the sun to be able to meet missional requirements.

Under such flight conditions, it appears that the temperature range to which the sheaving cable is submitted extends from $+260°$ C. to $-170°$ C., relative to the ambient temperature, and that the solution of the differential dilation problem has a very great significance.

Thus, under the mentioned temperature conditions, a sheaving cable of a dilation coefficient of $17 \times 10^{-6}$ mm/mm/°C. and a length of 2,000 mm will in one case be extended by 9 mm and in the other case be shortened by 6 mm.

This invention relates to a multiple locking device insensitive to thermal variations and such as as to permit the mentioned problems to be solved in a particularly simple and efficient manner since it provides for the double possibility of:

being relieved from differential dilations by acting as a compensating means for length and tension, and authorizing the multiplication of the sheaving points due to a decrease in the required holding force necessary for immobilizing the stop catches.

In other terms, and as will be described in detail hereinafter in connection with FIGS. 3 to 10, the locking device according to the invention ensures at each sheaving point of the appendix:

the maintaining of a stop catch or latch in such a position which ensures the sheaving of the appendix, in the occurrence, the holding of the stop catch 8 in such a position as to immobilize the link 6 on which the end $1_B$ of the clamp 1 comes to bear so as to be hooked thereon;

the compensation for the differential dilation effects of cable 11 by causing the stop catch 8 to fulfill its locking function in the required temperature range;

the demultiplication of the force required for holding the stop catch 8 in the locked position, the release of the element to be locked 6, by cutting off the sheaving cable 11, a very high probability of actual operation.

Figure 3:
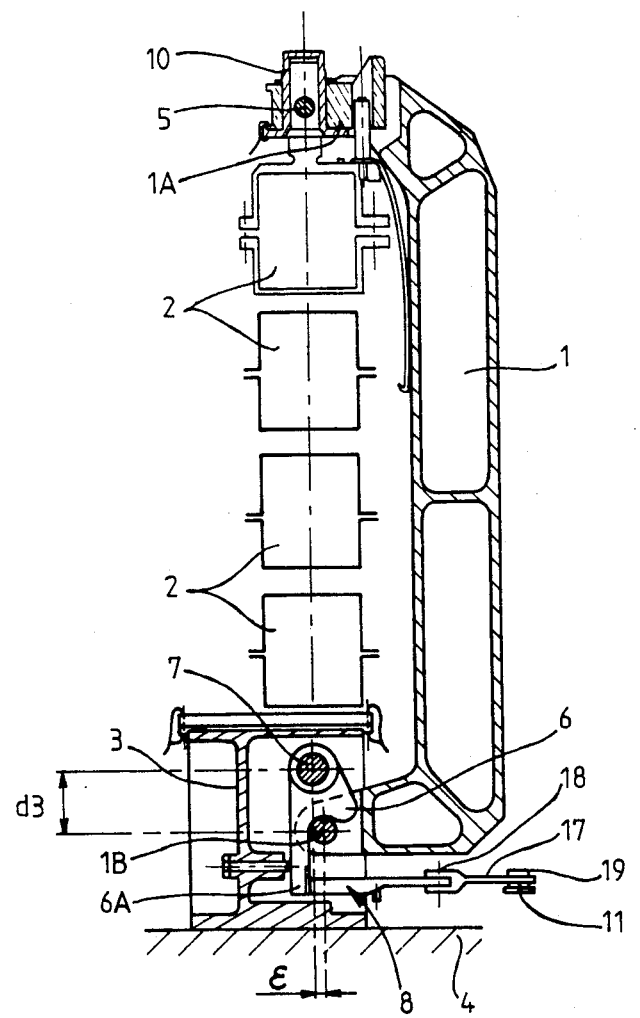
FIG. 3 is a vertical cross-sectional view of the sheaving point for solar generator of the general type shown in FIG. 1, held in a launching configuration through a locking device according to the invention.
Figure 4:
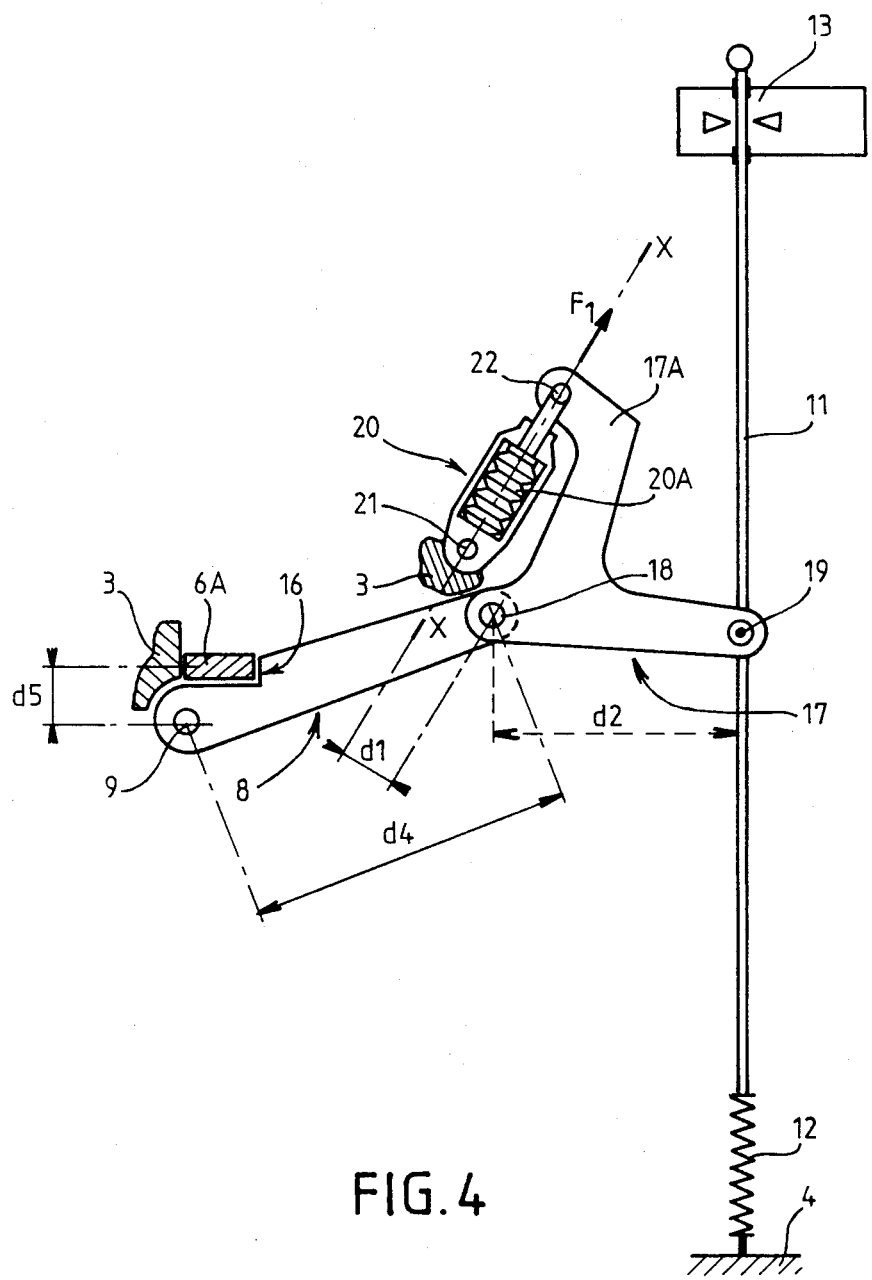
FIG. 4 is a schematic planar view of the locking mechanism proper of FIG. 3.

Referring more especially to FIGS. 3 and 4, it can be seen that the locking device of each sheaving point is characterized by the combination of the following means:

a stop catch 8 hinged at 9 to the foot 3 which provides for the immobilization of the free ends $6_A$ of the link 6 constituting the element to be locked, e.g. by means of a suitable slot 16;

an elbow lever denoted by the general reference 17 jointed at one end 18 to the free end of the stop catch 8, on the one hand, and on the other hand connected at 19 at its other end to the sheaving cable 11;

an elastic link designated by the general reference 20 which is hinged at 21 to the foot 3, on the one hand, and on the other hand, at 22 to the elbow lever 17 which for this purpose is provided with a finger $17_A$, The securement of element $6_A$ is provided by the sheaving cable 11 which through the elbow lever 17 and the elastic link 20 holds the stop catch 8 in a locked position for as long as the shearing device 13 for the cable has not been operated.

It will be understood that to obtain the above described locking the elastic link 20 must exert a pushing force in the direction of arrow $F_1$ upon finger $17_A$ of the elbow lever 17 in the locking position of FIG. 4. Such force produces a moment contrary to the holding moment exerted by the cable 11 upon the elbow lever 17.

It has been shown hereinabove that this invention enables the sheaving points to be multiplied due to the decreased holding force necessary for immobilization of the stop catches.

Referring again to FIG. 4, it can be readily seen that the force demultiplication function is ensured by the ratio of the distances i.e. distance $d_1$ between the hinging axis 18 of the elbow lever 17 and the longitudinal axis XX' of the elastic link 20, on the one hand, and on the other hand, the distance $d_2$ between the hinging axis 18 of the elbow lever 17 and the cable 11.

It is important to note that one can greatly reduce the tension in the cable 11 until annulation thereof by reducing the distance $d_1$ between the hinging axis 18 of the elbow lever 17 and the axis XX of the elastic link 20.

However, for reasons of reliability it is practically desirable to maintain distance $d_1$ of a sufficient value to ensure self-relief of the system in all cases through the bias of the spring $20_A$ of the elastic link 20.

It appears from the foregoing that the locking device according to the invention presents the advantage of easily realizing a significant demultiplication of the tension force of the clamp 1 and the force which is to be provided in the cable 11.

With reference to FIGS. 3 and 4, one can practically realize the following reduction ratios with each of the respective constitutive elements:

for the link 6 hinged to the foot 3 (FIG. 3) the reduction ratio $d_3/\epsilon$ can be ~5;

for the stop catch 8 (FIG. 4) the reduction ratios $d_4/d_5$ can be ~5;

for the elbow lever 17-elastic link 20 assembly, the reduction ratio $d_2/d_1$ can be ~10, i.e. an overall reduction ratio of ~1/250, which means that for a clamping effort of the clamp equal to 10,000 N, the nominal tension of cable 11 reaches 40 N, at each sheaving point.

The locking device according to the invention is therefore particularly advantageous to ensure safe holding of appendices requiring several immobilization points, which is the case with appendices of satellite of the solar generator, antenna reflector, mast types, and so on.

It has been shown hereinabove that this invention permits moreover to ensure the locking function of the stop catch 8 in the temperature range required to compensate for the differential dilation effects.

Figure 5:
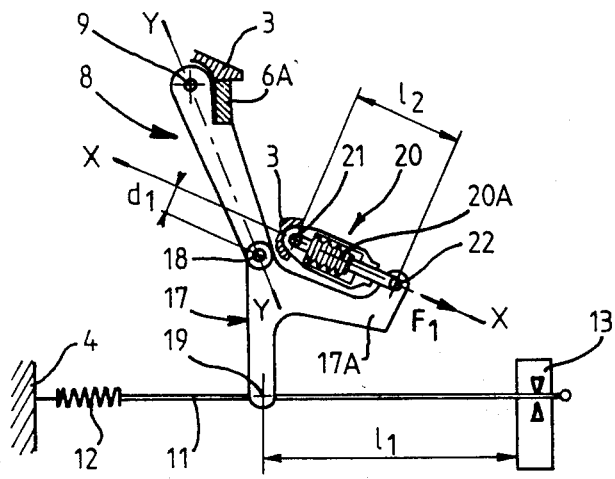
FIGS. 5, 6 and 7 are schematical views on a smaller scale of the same locking mechanism which is respectively shown in the nominal locked position, in the unlocked position with compensation for any shortening of the sheaving cable, and in the locked position with compensation for any lengthening of the cable.
Figure 6:
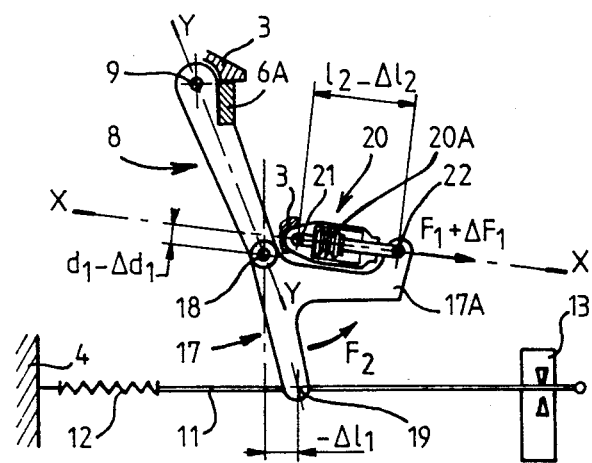
Figure 7:
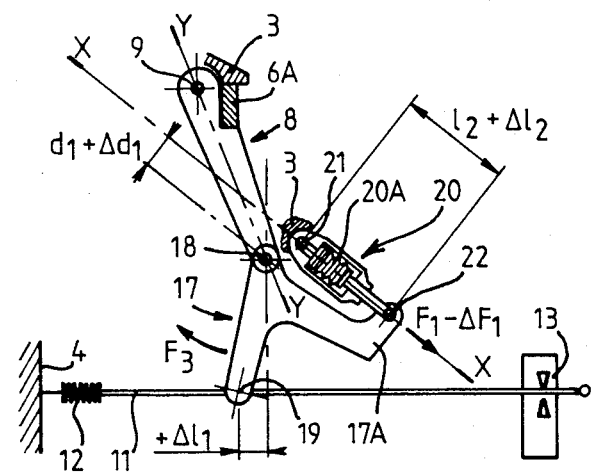

It will now be described with reference to FIGS. 5, 6 and 7 how the locking device ensures compensation for the dilation effects relative to the nominal locked position such as shown in FIG. 5, in succession in the case of the shortening of the cable (FIG. 6) and then in the case of the lengthening of the cable (FIG. 7).

In the nominal locked position such as shown in FIG. 5 corresponding to that occurring on the ground and during the satellite launching configuration, the various positioning and tensioning adjustments are determined in such way that the constitutive elements of the locking have the relative positions shown in said FIG. 5, namely, for one thing, that the stop catch 8 being applied on the link to be locked $6_A$, the positioning of the joint 19 of the elbow lever 17 determined, for example, by distance $l_1$ between said joint 19 and the housing of the shearing device 13) is such that the length $l_2$ of the elastic link 20 between both of its joints 21 and 22 should correspond to the average value of biasing force $F_1$ of the spring $20_A$.

Referring now to the case of the shortening of the cable 11, such as shown in FIGS. 6, it can be seen that the stop catch 8 remaining applied upon the link to be locked $6_A$, said shortening $l_1 - \Delta l_1$ of the cable 11 causes rotation of the elbow lever 17 in the direction of the arrow $F_2$, thereby resulting in:

a very small reduction $l_2 - \Delta l_2$ of the elastic link length 20 a very slight increase in the traction force $F_1 + \Delta F_1$ of such link due to the compression of spring $20_A$;

a reduction of the smaller lever arm $d_1$ which becomes $d_1 - \Delta d_1$ hence a decrease in the tension in the cable;

and an increase in the holding force of the mechanism on link $6_A$ to the force $F_1 + \Delta F_1$ of the elastic link 20 becoming closer to the perpendicular to the longitudinal axis YY of the stop catch 8.

Referring then to the case of the lengthening of the cable 11, such as shown in FIG. 7, it can be seen that the stop catch 8 remaining applied upon the link to be locked $6_A$, said lengthening $l_1 + \Delta l_1$ of cable 11 causes rotation of the elbow lever 17 in the direction of the arrow $F_3$, thereby resulting in:

a very little lengthening $l_2 + \Delta l_2$ of the length of the elastic link 20, a slight reduction of the traction force $F_1 - \Delta F_1$ of such link due to the lengthening of spring $20_A$, such effort remaining always sufficient to avoid rotation of the link, this being provided for accurately determining the minimum value of the spring;

an increase of the smaller lever arm $d_1$ becoming $d_1 + \Delta d_1$, hence an increase in the tension of the cable; and a decrease of the holding force of the mechanism upon the link $6_A$ due to the force $F_1 - \Delta F_1$ of the elastic link 20 being directed more obliquely relative to the longitudinal axis YY of the stop catch 8.

It results from the foregoing that the locking device according to the invention provides means for ensuring perfect locking even in the case of significant differential dilations between the body of the space vehicle and the sheaving cable or shuttle.

It has been shown above how it was possible to determine the various reduction ratios relative to the different constitutive elements: the link 6 jointed to the foot 3; the stop catch 8; the elbow lever 17-elastic link 20 sub-assembly, to obtain a significant reduction ratio between the tension force of the clamp 1 and the force in the cable 11.

Through extrapolation the same locking device can be designed as a function of specified thermal conditions and sizes of the above mentioned constitutive elements.

It has been seen hereinabove that the problem resulting from differential dilations is important, more especially in the case of a satellite stabilized according to three of its axes.

The locking device according to the invention appears especially advantageous in the application thereof to the immobilization of satellite appendices requiring several securement points of the solar generator, antenna reflector, mast type, and so on.

Figure 8:
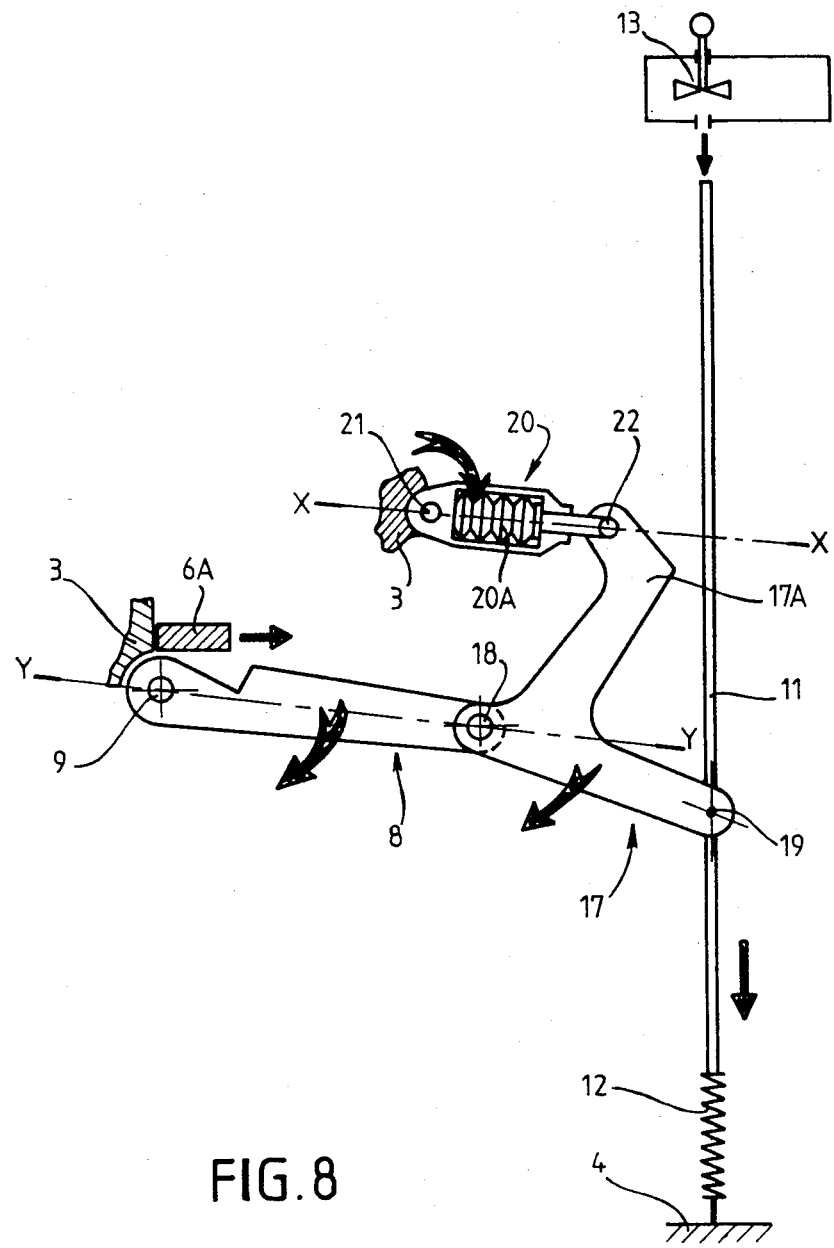
FIG. 8 is an explanatory diagram showing the operation of the locking mechanism after cutting off the sheaving cable to cause release of the locked element.
Figure 9:
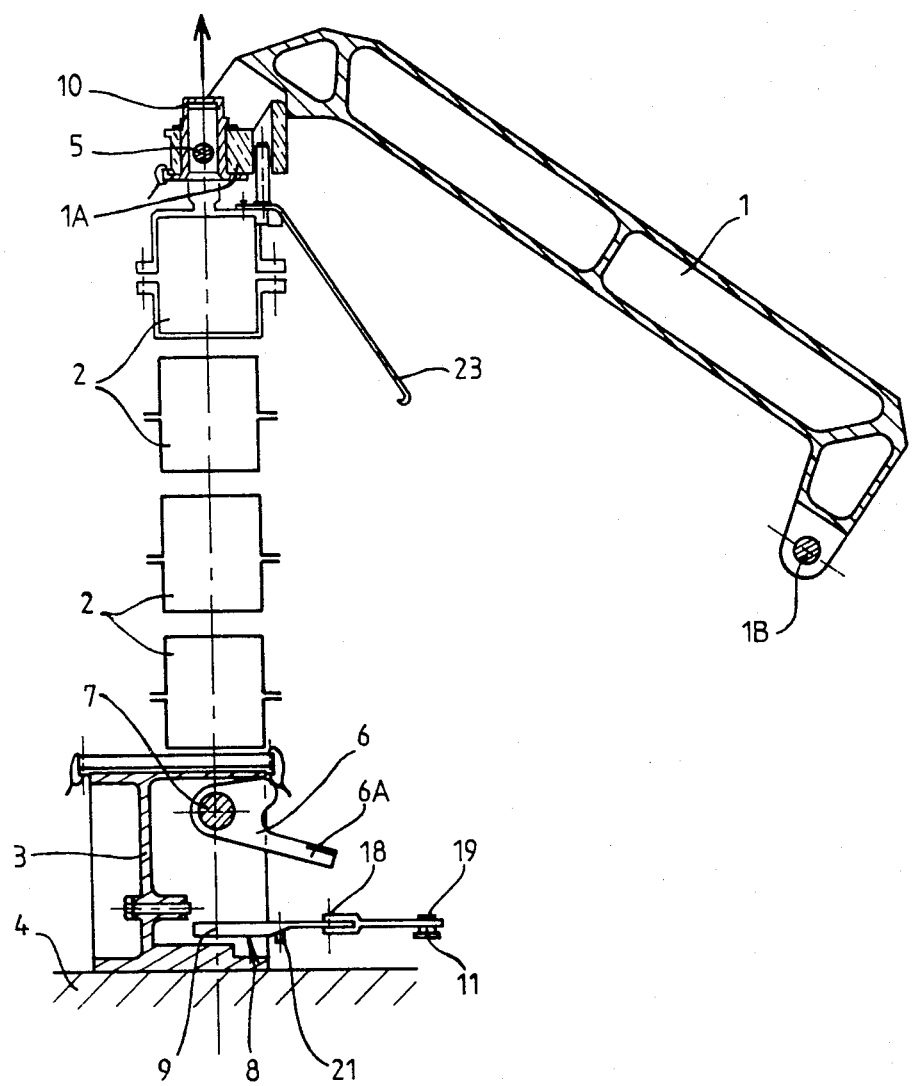
FIG. 9 is a vertical cross-sectional view of the sheaving point for solar generator of FIG. 3 in its position when the displaying of the appendix is permitted after release of the locking device and FIG. 10 is a perspective view of a solar generator sheaving point of the general type of FIG. 1, but incorporating a locking device according to the invention.
Figure 10:
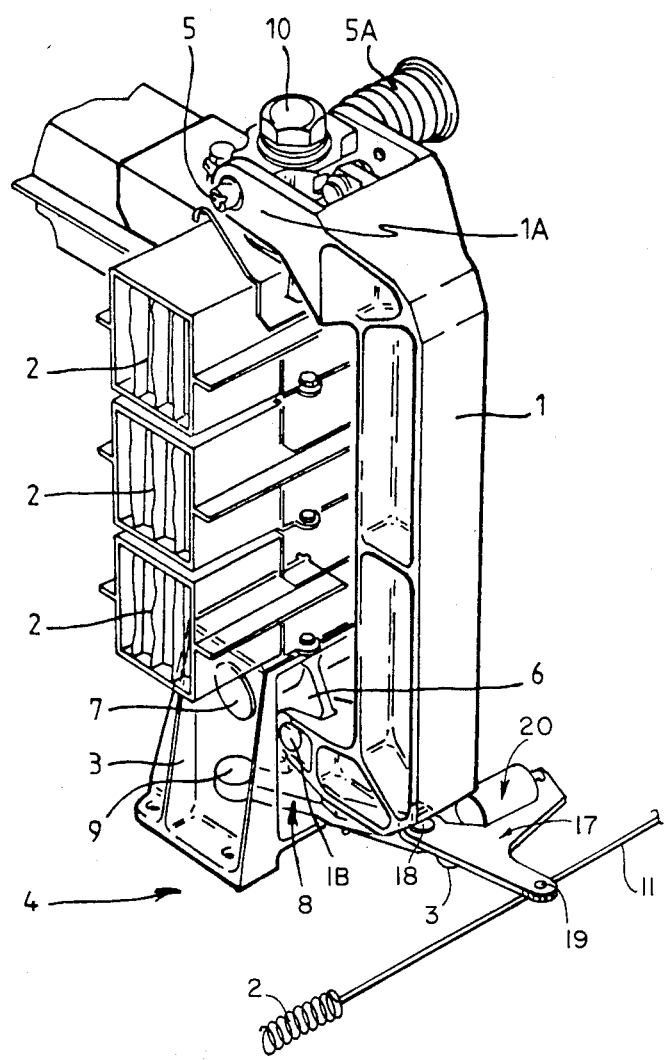

With reference more particularly to FIGS. 4, 8 and 9, it will now be explained how the release of the locked elements, i.e. the end $6_A$ of the link 6 will be effected merely by cutting off the sheaving cable 11 by means of device 13.

Assuming that the locking mechanism is in the initial position of FIG. 4, it can be easily realized that as soon as the device 13 is operated and cuts off cable 11, the combined action of spring $20_A$ and return spring 12 of cable 11 causes, in a first step, the rotation of the elbow lever 17 about its hinging axis 18, then in a second step the rotation of stop catch 8 when the elastic link 20 no longer provides the holding force, and then the complete moving off of the stop catch 8 provided by the elbow lever 17 and the elastic link 20 the tensioning spring $20_A$ of which is then in a position of internal abutment and the longitudinal axis XX of which is practically parallel to the longitudinal axis YY of the stop catch 8. These different complete moving off motions of stop catch 8 are shown by arrows in FIG. 8.

Referring to FIG. 9, it can readily be seen that as soon as the locking device has been operated as explained hereinabove, and caused complete moving off of the stop catch 8, the link 6 is free to pivot under the action of the clamp 1, which acts as a spring due to the tensioning screw 10 and to the fact that the link 6 is itself designed for providing self-release thereof because of the offsetting between the axis 7 of said link and the axis $1_B$ of clamp 1 applied upon said link, in the launching configuration, as clearly appears in FIG. 3. The clamp 1 is brought to its upper position under the biasing force of the return spring $5_A$ mounted on the hinging axis 5, it being noted that a supplementary spring 23 is provided to hold the clamp 1 in its high position and is designed to provide motorization thereof in the event that the return spring $5_A$ should not be operable.

All the sheaving points such as those schematized in FIG. 2 are obviously unlocked simultaneously and the appendix which was held by the sheaving points, in the occurrence, the solar generator, is then released and its displaying can be effected.

It will be understood that this invention was only described and represented in a purely explanatory and not at all limitative manner and that technical equivalent parts can be substituted for its constitutive elements without departing from its scope which is defined in the attached claims.

We claim:

1. A multiple locking device insensitive to thermal variations to ensure temporary locking of the sheaving points for a space vehicle appendix by means of a single sheaving cable which is cut off when it is desired to effect displaying of the appendix, said device comprising at each of said sheaving points:
   a sheaving clamp hinged to said appendix and maintained against a foot rigidly secured to the structure of the space vehicle through link means including an element to be locked,
   a stop catch hinged to the foot of the sheaving point, said stop catch providing temporary immobilization of the element to be locked at the sheaving point,
   an elbow lever hinged to the stop catch on the one hand, and on the other hand, connected to the sheaving cable, and
   an elastic link hinged to the foot of the sheaving point at a first hinging point on the one hand and on the other hand to the elbow lever at a second hinging point in such a manner that the elastic link exerts upon the elbow lever a force to balance the holding force exerted therepuon by the sheaving cable,
   whereby temporary immobilization of the element to be locked at the sheaving points is ensured through the sheaving cable which through the elbow lever and the elastic link holds the stop catch in its locked position as long as the shearing device for the sheaving cable has not been operated.

2. A locking device according to claim 1, wherein the elbow lever comprises a finger to which the elastic link is jointed, the holding tension exerted in the sheaving cable being reduced to the desired minimum value by reducing the distance of the hinging axis of the elbow lever on the stop catch to the longitudinal axis of the elastic link.

3. A locking device according to claim 2, wherein the elastic link comprises an intermediary spring the average value of a nominal biasing force of which, exerted between both hinging points of the link, is determined in such way as to ensure automatic compensation for the differential dilation effects relative to said nominal average value and so that the shortening of the sheaving cable brings about a shortening of the link and a compensating increase of the biasing force exerted by the spring, whereas the lengthening of the sheaving cable brings about a lengthening of the link and a compensating reduction of the biasing force exerted by the spring.

* * * * *